(12) United States Patent
Krottinger

(10) Patent No.: US 9,380,763 B2
(45) Date of Patent: Jul. 5, 2016

(54) DOG SHOE

(76) Inventor: Elizabeth J. Krottinger, Addison, TX (US)

( * ) Notice: Subject to any disclaimer, the term of this patent is extended or adjusted under 35 U.S.C. 154(b) by 1808 days.

(21) Appl. No.: 11/398,245

(22) Filed: Apr. 5, 2006

(65) Prior Publication Data

US 2007/0039566 A1  Feb. 22, 2007

Related U.S. Application Data

(63) Continuation-in-part of application No. 11/204,696, filed on Aug. 16, 2005, now abandoned.

(51) Int. Cl.
*A01K 13/00* (2006.01)
(52) U.S. Cl.
CPC .................................. *A01K 13/007* (2013.01)
(58) Field of Classification Search
CPC ................................................... A01K 13/007
USPC .......................... 119/850; 54/82; 36/111–112
See application file for complete search history.

(56) References Cited

U.S. PATENT DOCUMENTS

| | | | | |
|---|---|---|---|---|
| 1,772,673 A | * | 8/1930 | MacDonald | 24/713 |
| 3,146,377 A | * | 8/1964 | Whitton, Jr. | 361/223 |
| D289,224 S | * | 4/1987 | Free | D2/897 |
| 4,724,623 A | * | 2/1988 | Silverman | 36/112 |
| 5,148,657 A | * | 9/1992 | Stafford et al. | 54/82 |
| D379,251 S | * | 5/1997 | Mezey | D30/146 |
| 6,026,548 A | * | 2/2000 | Jackson | 24/712 |
| 6,526,920 B1 | * | 3/2003 | Griffin | 119/850 |
| 6,832,442 B2 | * | 12/2004 | Lewis et al. | 36/97 |
| D521,693 S | * | 5/2006 | Alameddine et al. | D30/146 |
| D542,482 S | * | 5/2007 | Krottinger | D30/146 |
| 2005/0188925 A1 | * | 9/2005 | Yun et al. | 119/850 |

* cited by examiner

*Primary Examiner* — Joshua Huson
(74) *Attorney, Agent, or Firm* — Howison & Arnott, LLP

(57) ABSTRACT

A dog shoe has a durable molded sole, a flexible fabric upper, elastic members that urge opposed edges of the shoe upper together to snuggly retain the shoe over the dog's paw, and a adjustable strap that employs a hook-and-loop fastener to retain a circumferential back section of the upper snuggly around the dog's lower leg.

11 Claims, 3 Drawing Sheets

DOG SHOE

CROSS-REFERENCE TO RELATED APPLICATION

This application is a continuation-in-part of application Ser. No. 11/204,696, filed Aug. 16, 2005.

FIELD OF THE INVENTION

The present invention relates to the structure of a dog shoe that can be snuggly fitted on a dog's foot.

BACKGROUND OF THE INVENTION

There have been many attempts to develop shoes or boots for dogs.

In U.S. Pat. No. 4,458,431 issued Jul. 10, 1984 to Suzanne E. Sinclair, a boot for a pet animal is shown comprising a sole member with a flexible upper attached together around the corresponding front and side edges.

U.S. Pat. No. 4,967,542 issued Nov. 6, 1990 to Bonita M. MacDonald, discloses a dog boot for the rear leg of a dog having a foot, a tarsus joint and a fibular tarsal with a sole extending from the foot to the tarsus joint and an upper heel section fastened to the sole and fixed proximally the tarsus joint shaped so that the boot is anchored on the leg by the fibular tarsal.

U.S. Pat. No. 5,148,657 issued Sep. 22, 1992 to Vondie A. Stafford, et al, discloses a dog boot which has as particular portions, a foot, ankle and calf with the calf and ankle being large enough to accommodate the dog's paw passing through with the front of the boot having a vertical opening and a vertical panel, which is closed by a horizontal belt fastenably at optionally chosen vertical places along the back of the boot.

U.S. Pat. No. 5,495,828 issued Mar. 5, 1996 to Irving Solomon, et al, discloses a mitten-like pet animal boot comprising a pliable sleeve integrally formed to define a stitchless sleeve wherein the stitchless sleeve defines an open top and a closed lower end and is maintained in position by a fastening strap.

U.S. Pat. No. 5,528,885 issued Jun. 25, 1996 to Sally B. Chamberlain, discloses footwear for hoofed animals and comprises basically a flexible sleeve which is maintained in place by laces for closing and opening.

U.S. Pat. No. 6,186,097 issued Feb. 13, 2001 to Sandra Brockmann, et al, discloses a protective shoes for a dog paw which comprises two layers, at least of one of which is a breathable, semi-permeable material elastically stretchable in both lengthwise and cross directions, which is impermeable to water from the outside and humidity from the inside wherein the protective shoe is maintained in place by two straps.

U.S. Pat. No. 6,470,832 issued Oct. 29, 2002 to Charlton Peacock, relates to an animal boot configured to be similar to a sleeve held in place by a strap.

U.S. Pat. No. 6,526,920 issued Mar. 4, 2003 to Robert Griffin, discloses a boot comprising a boot top portion including a zippered openable and closeable opening with a shield positioned around the front of the boot in its upper portion and maintained in position by a pair of straps.

U.S. Pat. No. 6,546,704 issued Apr. 15, 2005 to Lee A. Fisher, relates to a dog boot comprising a planar flexible sheet of material having a high friction surface on one side and is formed having a leg-engaging section and a foot engaging section, each of which is intended to be wrapped around the leg and foot respectively of an animal.

U.S. Pat. No. 6,832,442 issued Dec. 21, 2004 to Patricia Lewis, et al, discloses an adjustably sizeable and protective boot for an animal which has two hook and loop straps, each drawn around the protective boot and fastened to itself and to fastening means. One strap is drawn around the foot covering portion between the toe end and the ankle covering portion and the other strap is drawn around the ankle covering portion.

These animal foot covers, most of which are for dogs, do not adequately address the need for a dog shoe that is easy to use, and is snuggly retained in position on the dog's foot in a manner that is both effortless for the owner and comfortable for the dog.

SUMMARY OF THE INVENTION

According to the present invention, a dog shoe has a thermally insulating sole and breathable upper portions that together protect the dog's paw while being comfortable under varying weather conditions.

In accordance with a principal object of the invention, one or more elastic members facilitate easy insertion of the dog's paw into the shoe while snuggly and comfortably securing the shoe on the dog's foot.

In accordance with further important objects of the invention, an upper body includes a two-layer structure that provides a durable outer surface and a comfortable inner surface. The elastic members include an elastic lace that snuggly retain the dog's paw in place, and an elastic band between the outer and inner layers of the body that snuggly retains a back circumferential section of the body in place around the lower leg just above the paw.

BRIEF DESCRIPTION OF THE DRAWINGS

In the following description of the invention, the same numbers in the Figures will be used throughout to refer to the same components.

DESCRIPTION OF PREFERRED EMBODIMENTS

Figure 1:
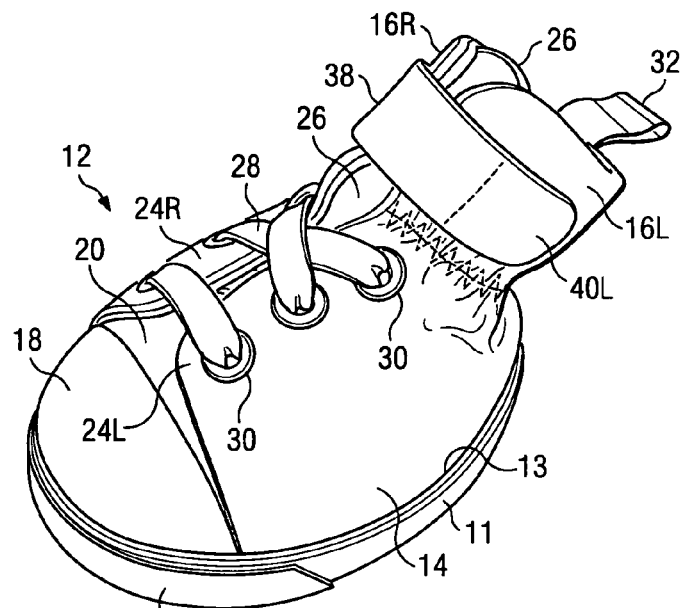
FIG. 1 is a perspective view of a dog shoe of the present invention.
Figure 3:
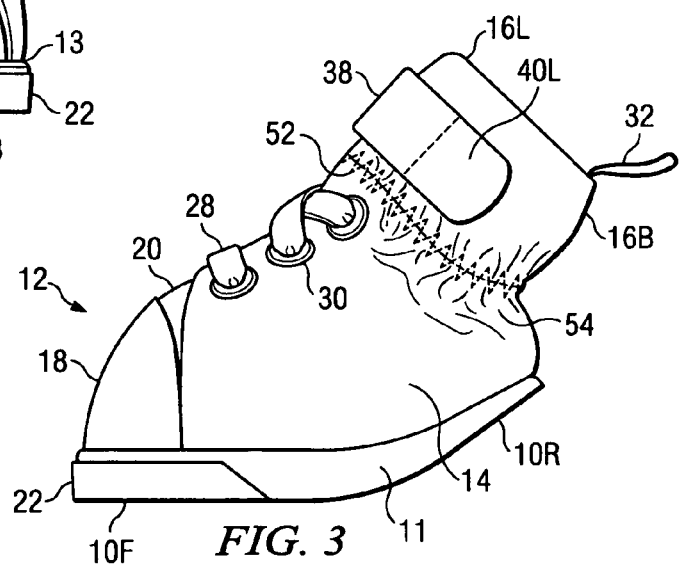
FIG. 3 is a left-side view of the dog shoe of FIG. 1.
Figure 5:
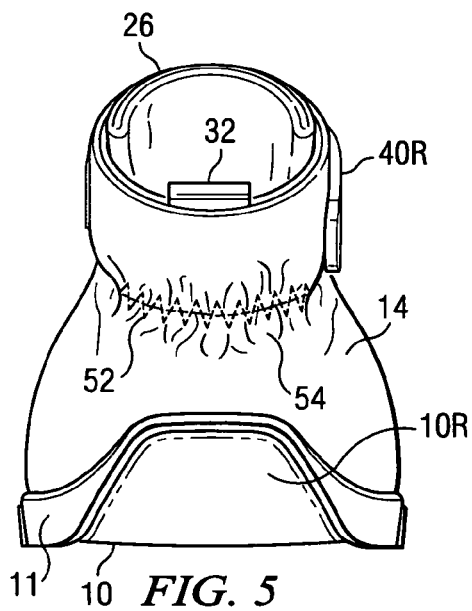
FIG. 5 is a back view of the dog shoe of FIG. 1.
Figure 6:
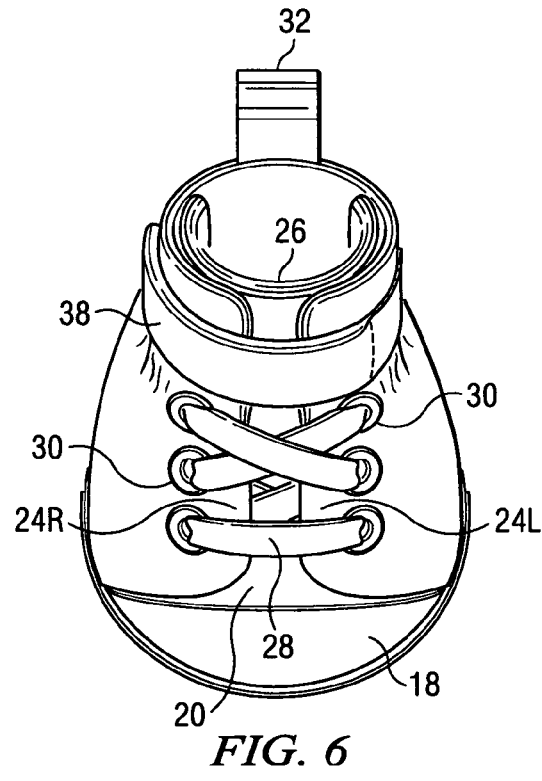
FIG. 6 is a top view of the dog shoe of FIG. 1.
Figure 7:
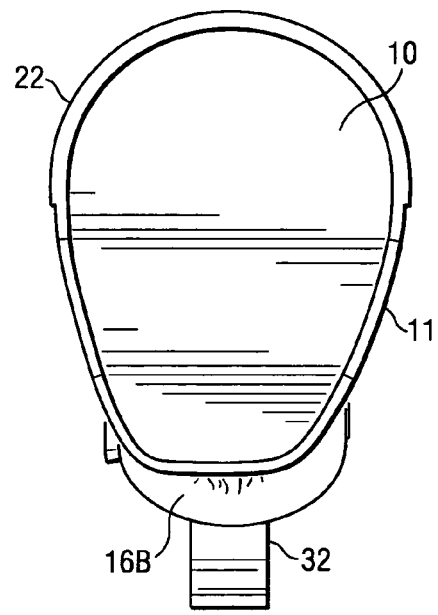
FIG. 7 is a bottom view of the dog shoe of FIG. 1.

Referring to the Figures, a dog shoe according to the present invention, while now be described in detail. FIG. 1 shows a perspective view of a dog shoe intended to be worn on the right front or rear paw of a dog. A similar dog shoe intended to be worn on the left front or rear paw of the dog would appear as a mirror image of FIG. 1. The other Figures show other views of the same dog shoe of FIG. 1. The dog shoe has a thermally insulating sole 10 that preferably consists essentially of a thermoplastic rubber (TPR) that is durable and can readily be molded to a desired shape. As seen in FIG. 3, the sole 10 preferably has a front horizontal portion 10F, and a rear sloped portion 10R that slopes upwardly from the horizontal portion by 30 to 40 degrees, most preferably by about 35 degrees. The sole 10 includes an integrally molded rim 11 at the entire periphery of the sole. As seen best in FIG. 5, the rim 11 preferably extends downward slightly beyond a main bottom surface of the sole 10. Thus, the main bottom surface of the sole 10 is slightly recessed within the rim 11.

A shoe upper 12 comprises the principal parts of the shoe above the sole 10. The shoe upper 12 includes a unitary body 14 that covers the paw and extends to the back of the shoe. Thus, the body 14 has front sections 15L and 15R that overlie the paw, and a back section that essentially surrounds the lower leg of the dog just above the paw. The back section consists of left and right sidewalls 16L and 16R and a back sidewall 16B. Bottom edge portions 13 of the body 14 may be adhesively attached to the top peripheral surface of the sole 10. Preferably, the sole rim 11 defines a raised peripheral edge that facilitates such attachment. Thus, the sole 10 will be understood to have a main top surface (not shown) that is recessed within the rim 11. A insole lining (not shown) preferably overlies and is adhesively attached to the main top surface of the sole 10. The insole lining preferably is a two-layer structure having a high density foam bottom layer and an adjoining soft cotton top layer.

The shoe upper 12 further includes a vinyl toe piece 18 that overlies a forepart 20. Bottom portions of the toe piece 18 and the forepart 20 may be adhesively attached to the inner surface of the sole rim 11. A scuffing bar 22 overlies the rim 11 at the front of the shoe. Preferably, the scuffing bar 22 is integrally molded with the sole 10. The body 14 and forepart 20 may be constructed using the same material. The front sections 15L and 15R of the body 14 are separated to define left and right opposed edges 24L and 24R, which overlie a tongue 26. The edges 24L and 24R extend rearward to the top of the back section where they form facing edges of the respective sidewalls 16L and 16R. The tongue 26 may be attached to the forepart 20, but preferably is an extension of the forepart 20. The edges 24L and 24R can be separated or drawn together to increase or reduce the interior space of the shoe body 14 above the paw. The forepart 20 and the tongue 26 permit the edges 24L and 24R to slide easily toward and away from each other while adjusting the interior space to provide a good fit around the dog's paw. A closure strap 38 (described in greater detail below) extends over the tongue 26 and releasably secures the edges 24L and 24R in an appropriate position.

An elastic lace 28 is used to draw the edges 24L and 24R together for a snug fit when worn. Like conventional non-elastic laces used in human shoes, the lace 28 preferably is a single continuous lace that is looped back and forth through eyelets 30 along the edges 24L and 24R of the body 14 passing over and under the edges. The eyelets 30 are arranged in multiple pairs as shown, there being three pairs in the disclosed embodiment, although two pairs would be functionally adequate, particularly for shoes for small dogs. The eyelets 30 preferably are decorative metal or plastic rings, but alternatively could be merely holes along the edges 24L and 24R of the body 14. For reasons primarily of style, the exterior lace portions crisscross at the top four eyelets and extend through the bottom two eyelets laterally over the respective edges 24L and 24R of the body 14. Unlike conventional human-shoe laces, the elastic nature of lace 28 serves to urge the opposed edges 24L and 24R together with an appropriate tension that comfortably secures the shoe around the dog's paw.

Figure 8:
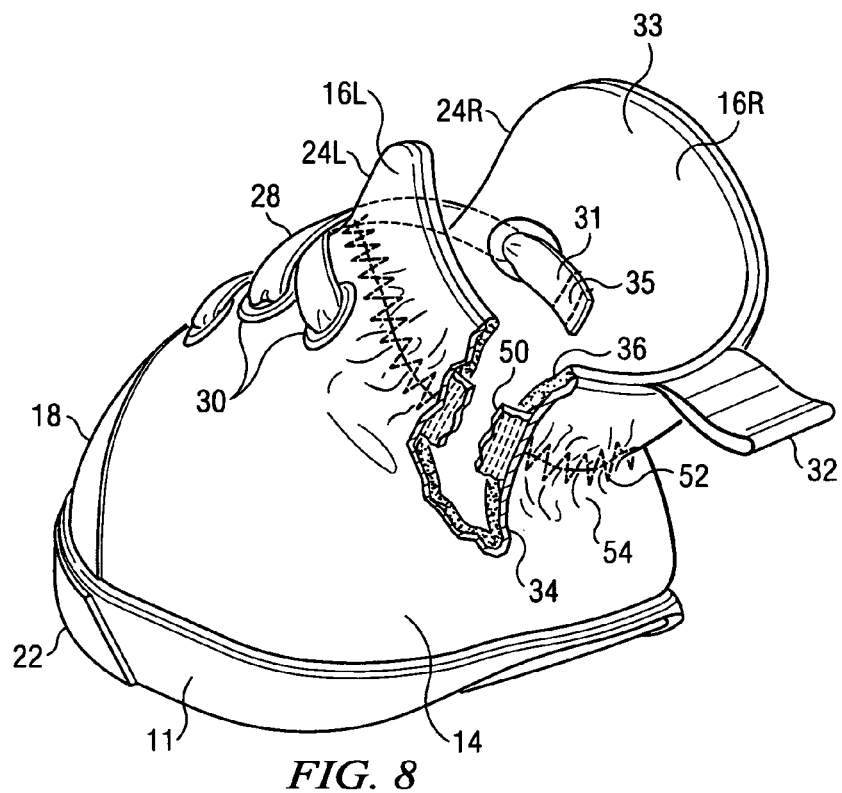
FIG. 8 is a left rear corner view of the dog shoe of FIG. 1, showing internal details in a broken away portion with some elements removed for clarity.

Referring to FIG. 8, a first lace end 31 of two identical ends is shown attached to the inner surface 33 of the right sidewall 16R of the body 14. A second lace end is not visible in FIG. 8, but has a similar attachment to the left sidewall 16L of the body 14. At its attachment point 35, the lace end 31 is stitched as depicted to the right sidewall 16R. It will be appreciated, therefore, that the lace 28 does not have free ends like a conventional lace, which are manually tied together after the shoe is in place on one's foot. Lace 28, while aesthetically appearing somewhat like a conventional lace, is permanently fixed at its ends and functions in a different way to elastically secure the shoe on a dog's foot. Because the edges 24L and 24R are constantly being urged together, it is desirable to include a pull tab 32 attached at the top of the back sidewall 16B to assist in pulling the shoe onto a dog's foot.

The preferred two-piece structure of the body 14 is seen in the view of FIG. 8. For clarity in describing the sidewall details and related structures, the tongue 26 and closure strap 38 are removed from the shoe in FIG. 8. The body 14 preferably has a outer layer 34 and inner layer 36, which preferably are sewn together along their top free edges and along their bottom edges where the body 14 is secured to the sole 10. The outer layer 34 is preferably made of canvas or similar durable fabric. The inner layer 36 is preferably made of a soft cotton fabric. These fabric materials make the shoe upper 12 breathable, and thus more comfortable for the dog. An elastic band 50 lies in a pocket-like space formed between the outer surface of the inner layer 36 and the inner surface of the outer layer 34. The elastic band 50 is secured at its ends near the respective edges 24L and 24R of the left and right sidewalls 16L and 16R by stitching (not shown) in a manner like that described above for the attachment 35 of the lace end 31.

To facilitate cooperative expansion and contraction of the outer layer 34 at the site of the band 50, stitching 52 is sewn through the fabric of the outer layer 34 coextensively along the length of the band 50, and preferably penetrates the band 50 but not the inner layer 36. Thus, the stitching secures the band 50 to the outer layer 34. The stitching preferably has a zigzag thread and an overlying straight-line thread, as shown. The effect of the stitching is to form a gathered region 54 in the outer layer 34 at the site of the band 50. Thus, the gathered region 54 can circumferentially expand as a dog's paw is inserted into the shoe, and then contract around the lower leg in accordion-like fashion as the dog's foot is properly positioned within the shoe. The inner layer 36 gathers or moves cooperatively with the outer layer 34 to also expand and contract circumferentially at the site of the band 50. This expansion and contraction capability of the sidewalls of the back section is accomplished while using materials for the layers 34 and 36 that are relatively inelastic.

Figure 2:
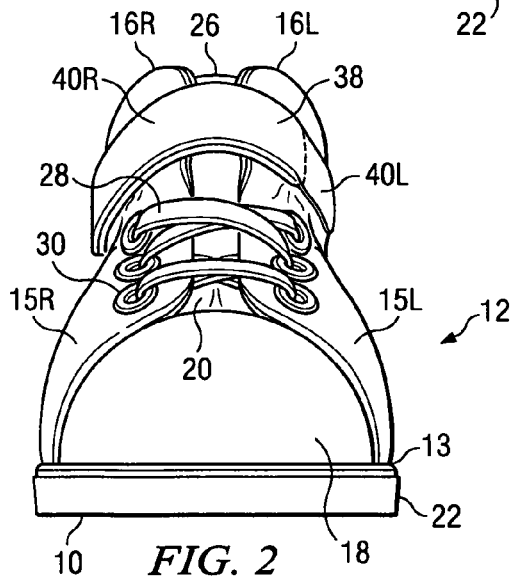
FIG. 2 is front view of the dog shoe of FIG. 1.

Referring again to FIG. 1, once the dog's foot has been inserted into the shoe, a closure strap 38 is used to locate the uppermost portions of the edges 24L and 24R in an appropriate relationship, typically with some degree of separation, to further secure and comfortably retain the shoe on the dog's foot. The strap 38 has a first end permanently secured to one sidewall, and a second end that can be secured to the other opposed sidewall in a releasable manner, preferably using a hook-and-loop type of fastener, such as a fastener sold under the VELCRO® brand. Specifically, in the case of the right dog shoe shown, as seen best in the view of FIG. 2, the strap 38 has first end 40L permanently fixed to the left sidewall 16L and second end 40R that is can be secured by a hook-and-loop fastener to the right sidewall 16R.

Figure 4:
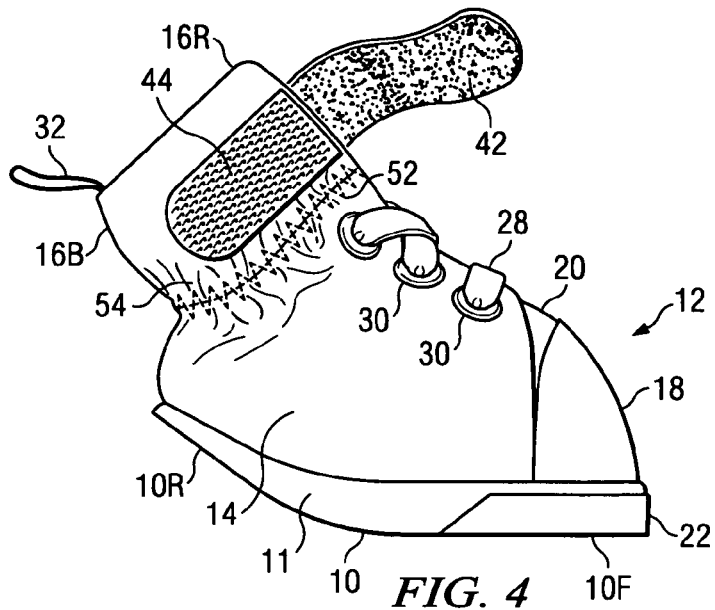
FIG. 4 is a right-side view of the dog shoe of FIG. 1, except that in the view of FIG. 4 a strap is shown in its open position to reveal its underside and the mating surface on the shoe.

Referring briefly to FIG. 4, the strap 38 is shown in its open position revealing the loop component 42 of a hook-and-loop fastener secured to its backside. The hook component 44 of the hook-and-loop fastener is secured to the outer surface of an upper portion of the right sidewall 16R in position to mate with the loop component 42 when the strap 38 is brought to its closed position, as seen for example in FIG. 2. Preferably, the orientation of the closure strap 38 (releasably secured on the left or on the right) is the only thing that differentiates a left shoe from a right shoe. The mirror image left and right orientations of the closure strap 38 are done for aesthetic purposes. Accordingly, for a particular size shoe, the principal component parts for left and right shoes are identical. This enables manufacturing efficiencies. For example, only one mold configuration is needed for each size shoe for molding the sole 10. A set of four shoes for a particular dog will include two identical left shoes and two identical right shoes, the left differing from the right only as to the closure strap orientation. Sole inserts may be provided to accommodate differences in the shapes of front and rear paws.

By contrast to previous dog shoes, which rely upon zippers and fixed restraining bands and the like, the present invention has overcome the disadvantages associated with such fasteners by the use of elastic members that retain the dog's foot in place and facilitate proper positioning of the shoe. The present invention has significant advantages over previous dog shoes in that it does not require multiple fixed straps or zippers to fasten the dog shoe snuggly in place on the dog's foot. Such devices rely upon the shoe being closely fitted to the dog's foot initially, while the elastic quality of inventive dog shoe allows a degree of variation that enables a particular shoe to continue to fit a dog's foot snuggly but comfortably, even as the dog grows over time to some extent. The closure strap 38 with its preferred hook-and-loop method of attachment also facilitates achieving a snug comfortable fit.

It will be appreciated from the foregoing that shoes according to the present invention can be produced in a variety of sizes to fit the feet of dogs of various sizes and can be formed of suitable materials of different colors and textures. Moreover, although the present invention has been described in detail with reference to a preferred embodiment, the scope of the invention as defined by the appended claims encompasses variations and equivalents that would naturally be suggested to those skilled in the art upon reading the foregoing description.

What is claimed is:

1. A dog shoe comprising:
    a sole;
    an upper attached to the sole, the upper including a body having a front section and a back section, the front section being adapted to extend upward from the sole and overlie a front portion of a dog's paw, the back section being adapted to extend from the front portion about the rear of the dog's paw and extend upward from the sole and surround the dog's lower leg just above the paw and the back section having an elasticity associated therewith to expand and contract about the rear of the dog's paw, the front section having opposed left and right edges, the back section having sidewalls with facing edges that are extensions of the opposed edges of the front section to form an opening for the dog's paw;
    eyelets in the front section arranged along the opposed left and right edges in multiple pairs;
    an elastic lace looped back and forth through the eyelets, the lace having first and second ends permanently secured to an interior surface of the sidewalls proximate to a respective eyelet proximate the opening on the left and right edges such that separation of the left and right edges to insert the dog's paw into the shoe will result in more separation proximate the ends of the left and right edges proximate the secured ends of the shoe so that the elastic lace urges the opposed edges of the front section together such that the elastic lace and the elasticity of the back section cooperate together to contract to and expand from the secured ends of the elastic lace; and
    a closure strap having a first end permanently secured to a first one of said sidewalls, and a second end releasably secured to a second one of said sidewalls proximate the upper portion thereof and above the secured end of the elastic lace, the closure strap making an adjustable attachment at its releasably secured end to permit adjustment of the circumference of the back section to achieve an appropriately snug fit around the dog's lower leg above the secured ends of the elastic lace, which is a releasable configuration to allow the dog's paw to be inserted and removed without the need to tighten or loosen any structure.

2. The dog shoe of claim 1 wherein the body includes a two-layer structure having an outer layer and an inner layer, and wherein the back section includes a circumferentially disposed gathered region below the closure strap defining an interior space between the outer and inner layers, and further comprising an elastic band having first and second ends disposed within the interior space such that the first and second ends of the elastic band attach to such interior space proximate to the secured first and second ends of the elastic lace, the elastic band contracting the back section around the dog's lower leg between the closure strap and the sole when the shoe is worn by the dog such that the elastic band and the elastic lace cooperate together to contract to and expand from the secured ends of the elastic lace and the elastic band.

3. The dog shoe of claim 2 wherein the outer layer includes stitching in the gathered region, the stitching being aligned with the underlying elastic band and securing the elastic band to the outer layer, whereby the stitching assists in the circumferential expansion and contraction of the outer layer in the gathered region in cooperation with the expansion and contraction of the elastic band.

4. The dog shoe of claim 2 wherein the outer layer comprises a durable canvas fabric and the inner layer comprises a soft cotton fabric, and further comprising a pull tab secured between the outer and inner layers at the rearmost top edge of the back section to assist in pulling the shoe onto the dog's paw.

5. The dog shoe of claim 2 wherein the sole has a front horizontal portion and a rear sloped portion that is sloped relative to the horizontal portion at an angle of about 35 degrees.

6. A dog shoe comprising:
    a molded sole having an integrally molded peripheral rim;
    an upper including a unitary body that is attached to the sole along and within the rim, the body having left and right front sections and a back section, the front sections being adapted to extend upward from the sole and overlie a dog's paw, the back section having an elasticity associated therewith and being adapted to extend from the left and right sections about the rear of the dog's paw and extend upward to wrap around and contract about the dog's lower leg just above the paw, the left and right front sections having respective opposed edges overlying a tongue, the back section having sidewalls with facing edges that are extensions of the opposed edges of the left and right front sections, the body further having an outer durable fabric layer and an inner layer of soft fabric;
    eyelets disposed in the left and right front sections arranged along and proximate to the opposed edges in multiple pairs;
    an elastic lace looped back and forth through the eyelets above the tongue, the lace having first and second ends terminating proximate the upper portion of the left and right front sections and at the upper ends thereof permanently secured within the body on the sidewalls so that the lace urges the opposed edges of the front sections together; and an elastic band secured to the body and lying entirely within an interior space between the outer and inner layers of the body in the back section and having first and second ends secured therein proximate the secured ends of the elastic lace on the sidewalls such that expansion and contraction of the elastic lace and the elastic band cooperate, the elastic band and the elasticity of the back section contracting the back section around the dog's lower leg when the shoe is worn by the dog, the elastic band cooperating with the elastic lace to allow expansion of the opening in the shoe for insertion of the dog's paw and thereafter to releasable secure the shoe to the dog's paw such that both the opening to the dog shoe and the contraction of the elastic band and back section cooperate.

7. The dog shoe of claim 6 wherein the ends of the elastic lace are secured to an inner surface of the sidewalls.

8. The dog shoe of claim 6 wherein the elastic band is secured to the outer durable fabric layer of the body at multiple points along the length of the elastic band to define a gathered region of fabric that expands and contracts in cooperation with the expansion and contraction of the elastic band when inserting the dog's paw into the shoe or removing the dog's paw from the shoe.

9. A dog shoe comprising:
a molded sole having an integrally molded peripheral rim;
an upper including a unitary body that is attached to the sole along and within the rim, the body having left and right front sections and a back section, the front sections being adapted to extend upward from the sole and overlie a dog's paw, the back section being adapted to extend from the left and right sections about the rear of the dog's paw and extend upward to wrap around the dog's lower leg just above the paw, the left and right front sections having respective opposed edges overlying a tongue, the back section having sidewalls with facing edges that are extensions of the opposed edges of the left and right front sections, the body further having an outer durable fabric layer and an inner layer of soft fabric;

eyelets disposed in the left and right front sections arranged along and proximate to the opposed edges in multiple pairs;

an elastic lace looped back and forth through the eyelets above the tongue, the lace having first and second ends terminating proximate the upper portion of the left and right front sections and permanently secured within the body to the sidewalls so that the lace urges the opposed edges of the front sections together; and an elastic band secured to the body and lying entirely within an interior space between the outer and inner layers of the body in the back section and having first and second ends secured therein proximate the second and secured ends of the elastic lace on the sidewalls, the elastic band cooperating with the elastic lace by contracting the back section around the dog's lower leg at the same time the left and right sections contract from the secured ends of both the elastic band and the elastic lace when the shoe is worn by the dog and cooperating with the elastic lace to releasably secure the shoe to the dog's paw and wherein movement of the dog's paw will cause the upper portion of the opposed edges to separate resulting in an increase in force to further secure the elastic band about the dog's paw.

10. The dog shoe of claim 9 wherein the ends of the elastic lace are secured to an inner surface of the body.

11. The dog shoe of claim 9 wherein the elastic band is secured to the outer durable fabric layer of the body at multiple points along the length of the elastic band to define a gathered region of fabric that expands and contracts in cooperation with the expansion and contraction of the elastic band when inserting the dog's paw into the shoe or removing the dog's paw from the shoe.

* * * * *